(12) United States Patent
Wakino

(10) Patent No.: US 12,399,547 B2
(45) Date of Patent: Aug. 26, 2025

(54) INFORMATION PROCESSING APPARATUS AND CONTROL METHOD THEREOF

(71) Applicant: CANON KABUSHIKI KAISHA, Tokyo (JP)

(72) Inventor: Shiori Wakino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 277 days.

(21) Appl. No.: 17/858,830

(22) Filed: Jul. 6, 2022

(65) Prior Publication Data
US 2023/0011674 A1  Jan. 12, 2023

(30) Foreign Application Priority Data
Jul. 7, 2021 (JP) ................................ 2021-113135

(51) Int. Cl.
| G06F 1/32 | (2019.01) |
| G06F 1/10 | (2006.01) |
| G06F 1/3237 | (2019.01) |
| G06F 1/324 | (2019.01) |

(52) U.S. Cl.
CPC ............. *G06F 1/324* (2013.01); *G06F 1/10* (2013.01); *G06F 1/3237* (2013.01)

(58) Field of Classification Search
CPC ........... G06F 1/324; G06F 1/3237; G06F 1/10
See application file for complete search history.

(56) References Cited

U.S. PATENT DOCUMENTS

| 6,546,496 B1* | 4/2003 | Wang .................... G06F 1/3237 713/322 |
| 2003/0037274 A1* | 2/2003 | Shikata ................. G06F 1/3228 713/500 |
| 2004/0003311 A1* | 1/2004 | Jones ................ H04W 52/0241 713/320 |
| 2007/0091712 A1* | 4/2007 | Mohanavelu ............. G06F 1/04 365/233.12 |

(Continued)

FOREIGN PATENT DOCUMENTS

| JP | 2003058271 A | 2/2003 |
| JP | 5751819 B2 | 7/2015 |

OTHER PUBLICATIONS

Yann Lecun, et al., Convolutional Networks and Applications in Vision, Proc. International Symposium on Circuits and Systems (ISCAS'10), IEEE, 2010.

*Primary Examiner* — Jaweed A Abbaszadeh
*Assistant Examiner* — Cheri L Harrington
(74) *Attorney, Agent, or Firm* — Canon U.S.A., Inc. IP Division

(57) ABSTRACT

An information processing apparatus comprises: an arithmetic unit configured to perform arithmetic operation processing using a hierarchical network; a storage unit configured to store input data inputted to the arithmetic unit and output data outputted from the arithmetic unit; a transmission unit configured to transmit to the arithmetic unit the input data stored in the storage unit; a reception unit configured to receive and store in the storage unit the output data from the arithmetic unit; and a control unit configured to, in (Continued)

a case where the input data cannot be transmitted from the storage unit to the arithmetic unit, control supply of an operation clock to the transmission unit based on network information that indicates a structure of the hierarchical network.

8 Claims, 13 Drawing Sheets

(56) References Cited

U.S. PATENT DOCUMENTS

| | | | | |
|---|---|---|---|---|
| 2014/0009195 | A1* | 1/2014 | Osborne | G06F 1/32 |
| | | | | 327/158 |
| 2014/0089699 | A1* | 3/2014 | O'Connor | G09G 5/363 |
| | | | | 713/300 |
| 2015/0160716 | A1* | 6/2015 | Hiraoka | G06F 1/3253 |
| | | | | 713/320 |
| 2018/0284868 | A1* | 10/2018 | Koker | G06F 1/3209 |
| 2019/0101952 | A1* | 4/2019 | Diamond | G06F 15/825 |
| 2019/0130245 | A1* | 5/2019 | Sakaguchi | G06F 11/183 |
| 2019/0227807 | A1* | 7/2019 | Martin | G06F 9/3869 |
| 2021/0011846 | A1* | 1/2021 | Venkatesh | G06F 12/023 |
| 2021/0041934 | A1* | 2/2021 | Desai | G06F 1/3237 |
| 2022/0180158 | A1* | 6/2022 | Whatmough | G06F 17/15 |
| 2022/0222513 | A1* | 7/2022 | Paramasivam | G06F 1/3237 |

* cited by examiner

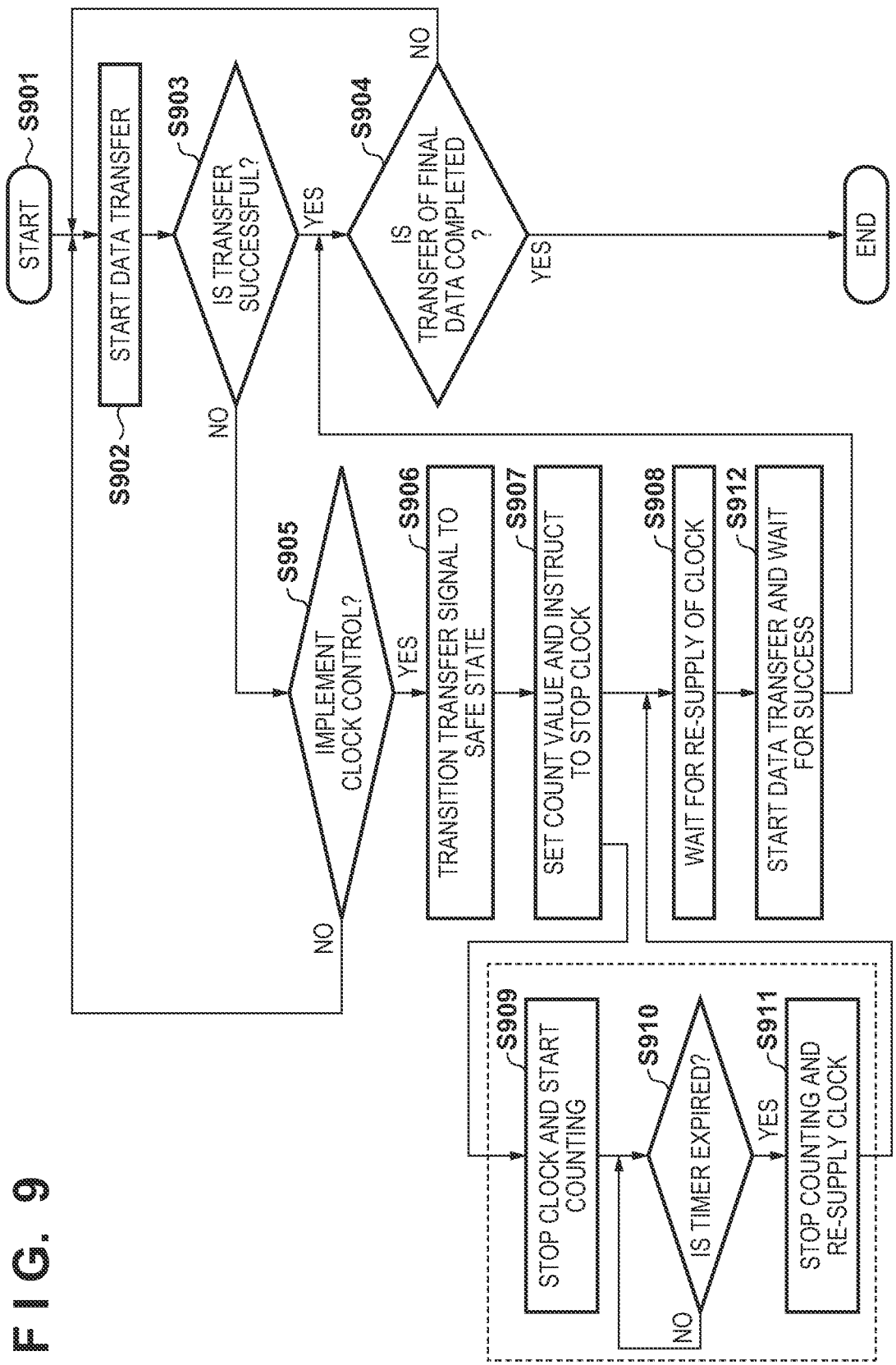

INFORMATION PROCESSING APPARATUS AND CONTROL METHOD THEREOF

BACKGROUND

Field of the Disclosure

The present disclosure relates to power saving of an information processing apparatus.

Description of the Related Art

Hierarchical arithmetic methods called CNNs (Convolutional Neural Networks) are attracting attention as methods that enable pattern recognition that is robust to variation in target objects. For example, Yann LeCun, Koray Kavukcuoglu and Clément Farabet, "Convolutional Networks and Applications in Vision", Proc. International Symposium on Circuits and Systems (ISCAS'10), IEEE, 2010 discloses various examples of application and implementation. In order to reduce the power consumption of CNN processing hardware, it is necessary to perform clock control in units of several small clock cycles.

In an arithmetic operation apparatus, when stopping a clock supplied to a particular functional module that has an input or output data transfer interface, it is necessary to prevent the occurrence of inconsistencies with surrounding modules. In Japanese Patent Laid-Open No. 2003-58271, when a clock stop request signal is asserted, a function module completes the processing that is currently being performed. Japanese Patent Laid-Open No. 2003-58271 also discloses a method for reducing power in which a data transfer interface is transitioned to a state in which transfer cannot be performed, an acknowledge signal is returned, and then a clock that is being supplied is stopped. Furthermore, Japanese Patent No. 5751819 discloses a method of forcibly shutting off input and output in which the procedure of asserting a request signal and returning an acknowledge signal is omitted.

However, in the method of Japanese Patent Laid-Open No. 2003-58271, there is a problem that it takes time for a procedure of asserting a request signal, returning an acknowledge signal, and then stopping a clock. Furthermore, in the method of Japanese Patent No. 5751819, since processing other than data transfer processing uniformly stops when a clock is stopped, processing that was being performed during a data transfer waiting time (such as next data transfer preparation) becomes impossible, and therefore, there is a possibility that the overall processing time will increase. Moreover, since a time lag occurs in the re-supply of a clock, there is a possibility that processing time may further increase.

Accordingly, since the on/off of a clock is repeatedly performed even within CNN processing of one frame when it is desired to stop the clock with fine granularity, the power saving effect becomes low in the above-described method.

SUMMARY

According to one aspect of the present disclosure, an information processing apparatus comprises: an arithmetic unit configured to perform arithmetic operation processing using a hierarchical network; a storage unit configured to store input data inputted to the arithmetic unit and output data outputted from the arithmetic unit; a transmission unit configured to transmit to the arithmetic unit the input data stored in the storage unit; a reception unit configured to receive and store in the storage unit the output data from the arithmetic unit; and a control unit configured to, in a case where the input data cannot be transmitted from the storage unit to the arithmetic unit, control supply of an operation clock to the transmission unit based on network information that indicates a structure of the hierarchical network.

According to another aspect of the present disclosure, an information processing apparatus comprises: an arithmetic unit configured to perform arithmetic operation processing using a hierarchical network; a storage unit configured to store input data inputted to the arithmetic unit and output data outputted from the arithmetic unit; a transmission unit configured to transmit to the arithmetic unit the input data stored in the storage unit; a reception unit configured to receive and store in the storage unit the output data from the arithmetic unit; and a control unit configured to, in a case where it is not possible to transfer the output data, control supply of an operation clock to the reception unit based on network information that indicates a structure of the hierarchical network.

The present disclosure efficiently reduces power consumption in an arithmetic operation apparatus.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 9 is a flowchart of clock control.

FIG. 13 is a diagram for explaining a calculation operation of a feature plane 1205a.

FIG. 14 is a diagram illustrating a time chart for explaining the calculation operation of the feature plane 1205a.

DESCRIPTION OF THE EMBODIMENTS

Figure 1:
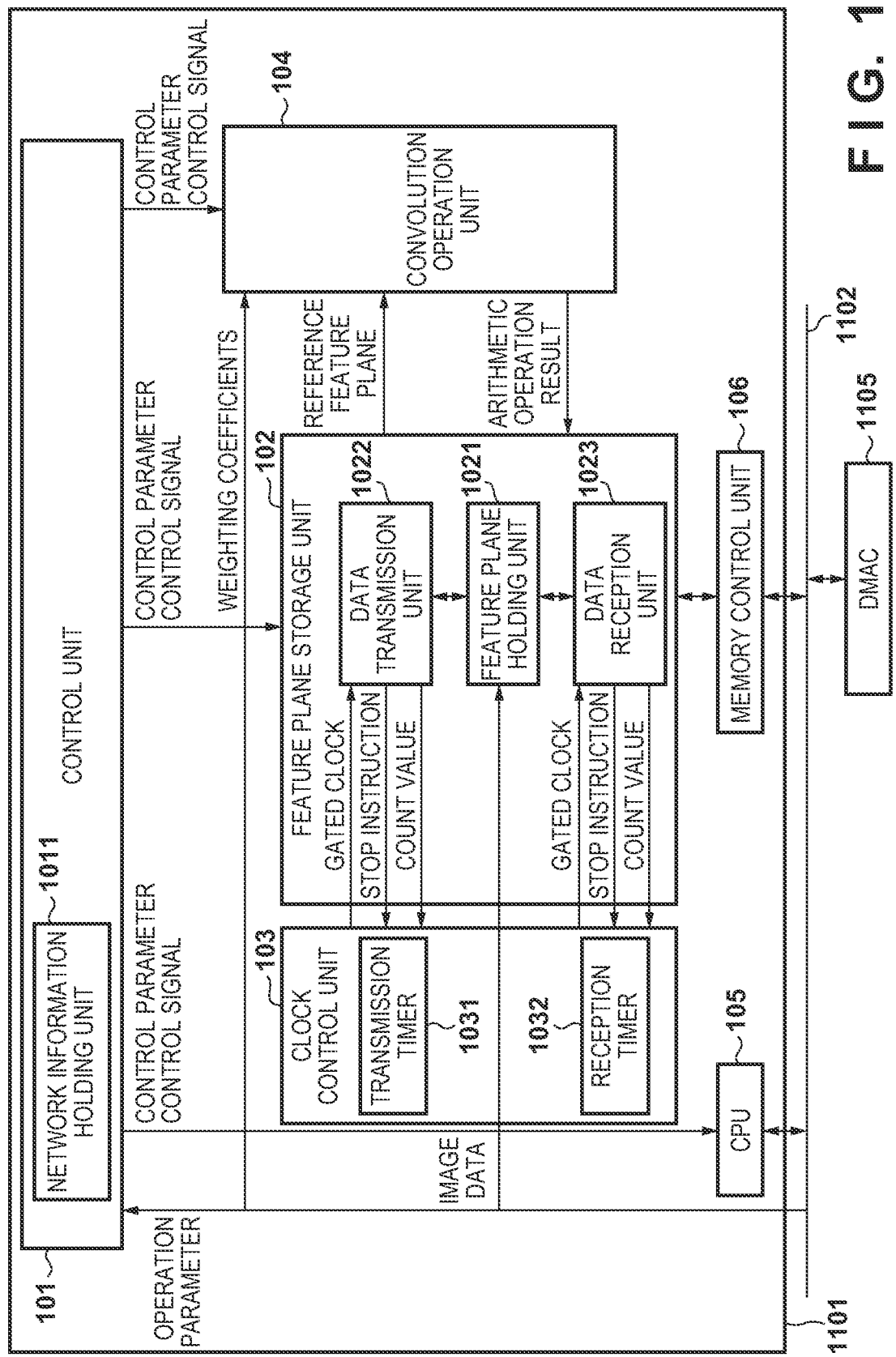
FIG. 1 is a block diagram of a recognition processing unit according to one or more aspect of the present disclosure.

Hereinafter, embodiments will be described in detail with reference to the attached drawings. Note, the following embodiments are not intended to limit the scope of the disclosure. Multiple features are described in the embodiments, but limitation is not made to the disclosure that requires all such features, and multiple such features may be combined as appropriate. Furthermore, in the attached drawings, the same reference numerals are given to the same or similar configurations, and redundant description thereof is omitted.

First Embodiment

A description will be given using an image processing system as an example of a first embodiment of an information processing apparatus according to the disclosure. Hereinafter, operation for CNN processing, which serves as a basis, will be first described, and then an image processing system that has a recognition processing unit that performs such CNN processing will be described.

<Convolutional Neural Network (CNN) Processing>

Figure 12:
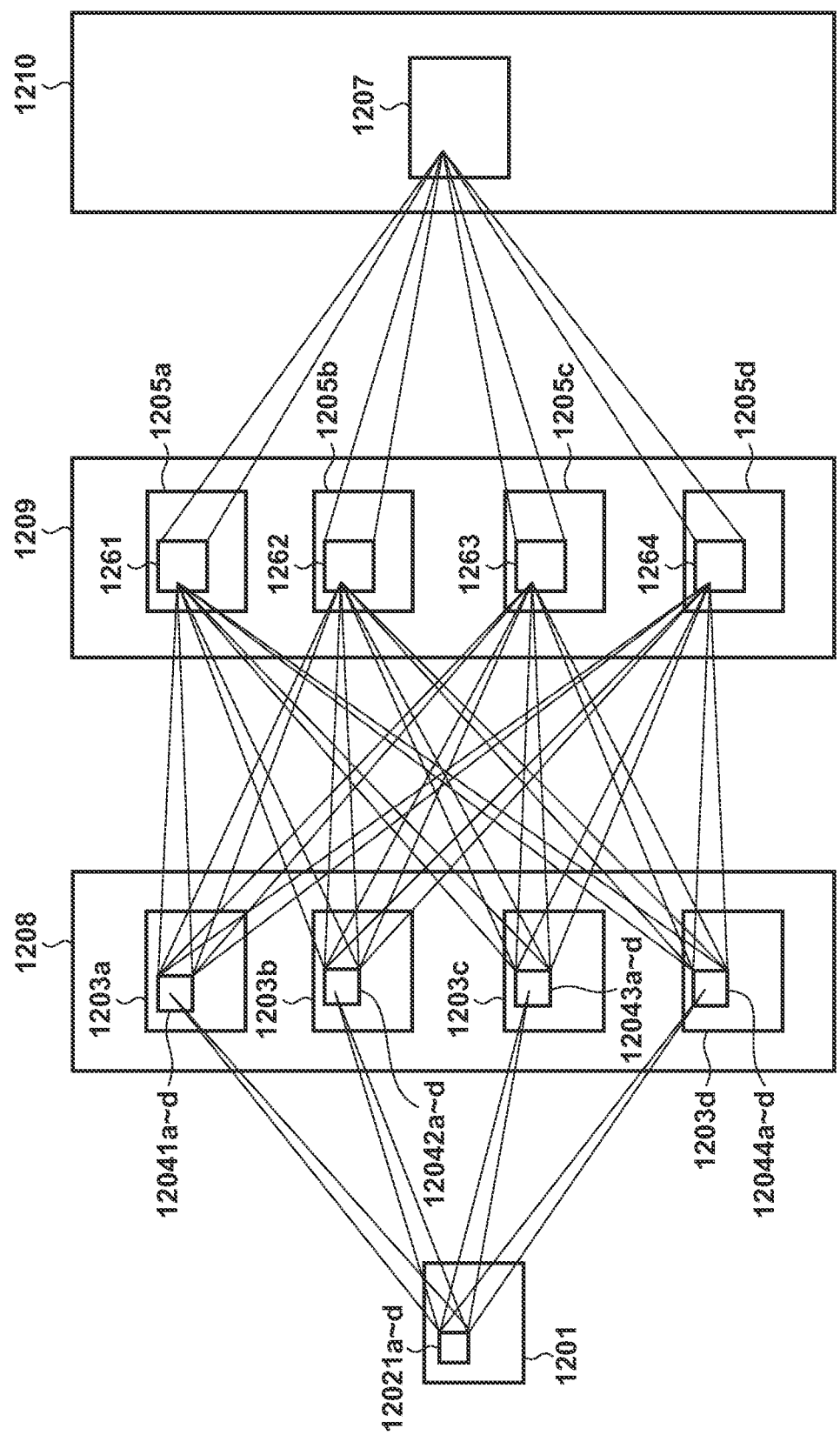
FIG. 12 is a diagram for explaining a network configuration of a CNN.

FIG. 12 is a diagram for explaining an exemplary network configuration of a CNN. A CNN is constructed as a hierarchical network and is configured by an input layer 1201, a first layer 1208, a second layer 1209, and a third layer 1210. When performing CNN processing on image data, the input layer 1201 corresponds to image data of a predetermined size. Feature planes 1203a to 1203d are feature planes of the first layer 1208, feature planes 1205a to 1205d are feature planes of the second layer 1209, and a feature plane 1207 is a feature plane of the third layer 1210. A feature plane is a data plane corresponding to a result of processing of a predetermined feature extraction operation (convolution operation and non-linear processing). The feature plane corresponds to a result of feature extraction for recognizing a predetermined object in an upper layer, and since it is a result of processing on image data, the result of the processing is also represented by a plane.

The feature planes 1203a to 1203d are generated by a convolution operation and non-linear processing corresponding to the input layer 1201. For example, the feature plane 1203a is calculated by a two-dimensional convolution operation schematically illustrated in a convolution kernel 12021a and a non-linear transformation of the arithmetic operation result. For example, the convolution operation of a kernel (coefficient matrix) size of columnSize×rowSize is a product-sum operation as indicated below.

$$\text{output}(x, y) = \sum_{I=1}^{L} \sum_{row=-rowSize/2}^{rowSize/2} \sum_{column=-columnSize/2}^{columnSize/2} \text{input}(x+\text{column}, y+\text{row}) \times \text{weight}(\text{column}, \text{row}) \quad (1)$$

Here,
input(x, y): reference pixel value at coordinates (x, y)
output(x, y): arithmetic operation result at coordinates (x, y)
weight(column, row): weighting coefficient used for calculating output(x, y)
columnSize, rowSize: convolution kernel size
L: number of feature maps in the previous layer.

In CNN processing, a feature plane is calculated by repeating a product-sum operation while scanning a plurality of convolution kernels in pixel units and performing non-linear transformation on the final product-sum result. In the case of calculating the feature plane 1203a, since the number of connections with the previous layer is "1", there is one convolution kernel. Here, the convolution kernels 12021b, 12021c, and 12021d are convolution kernels used when calculating the feature planes 1203b, 1203c, and 1203d, respectively.

Figure 13:
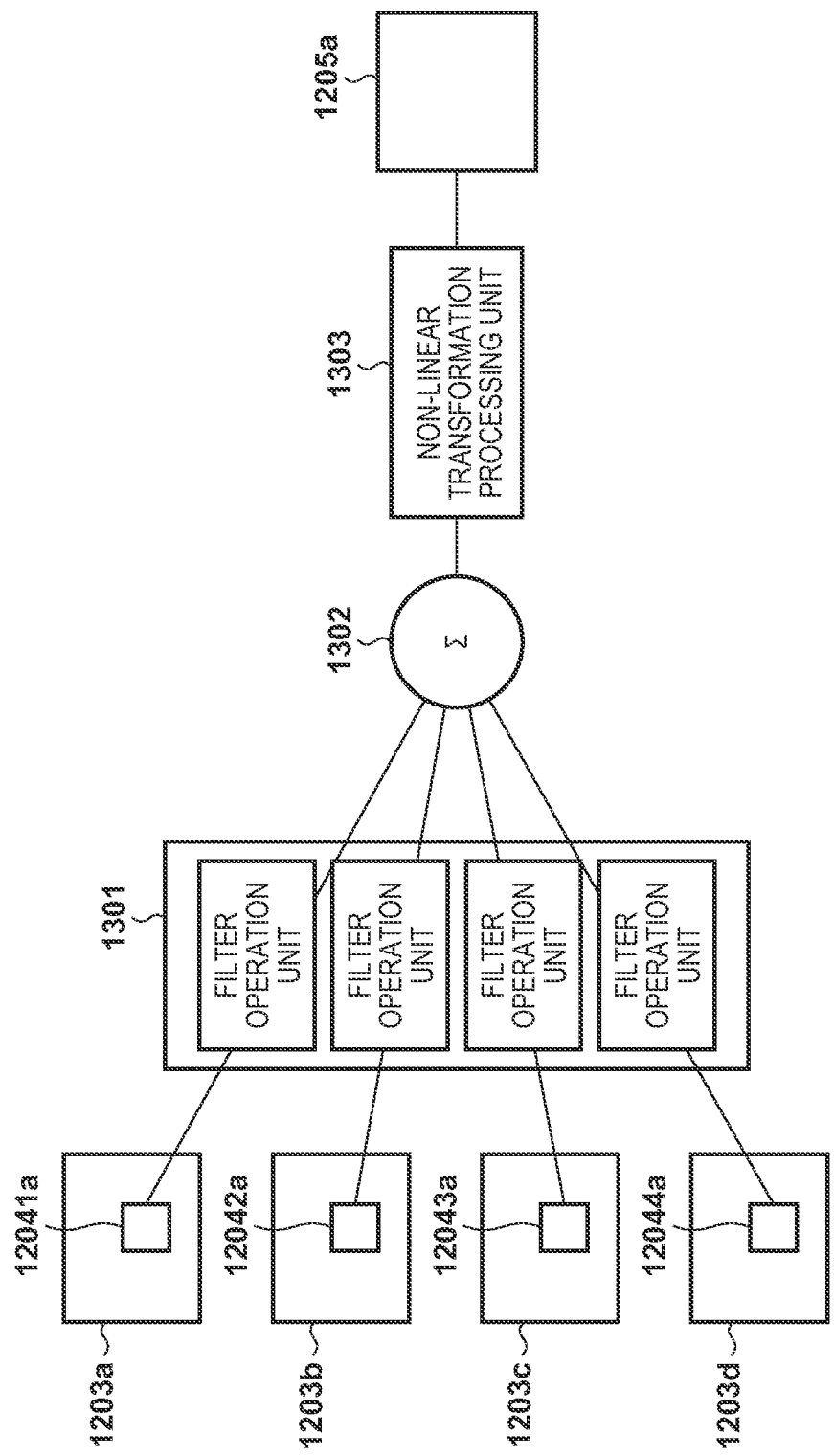

FIG. 13 is a diagram for explaining the operation for calculating the feature plane 1205a. As illustrated in FIG. 12, the feature plane 1205a is connected to the four feature planes 1203a to d of the first layer 1208, which is the previous layer. In the case of calculating the data of the feature plane 1205a, first, a filter operation unit 1301 performs a filter operation on the feature plane 1203a using a kernel 12041a and holds the result in a cumulative adder 1302. Similarly, the feature planes 1203b, 1203c, and 1203d are subjected to a convolution operation using kernels 12042a, 12043a, and 12044a, respectively, and the results are accumulated in the cumulative adder 1302. A non-linear transformation processing unit 1303 performs non-linear transformation processing using a logistic function or a hyperbolic tangent function (tanh function) after the completion of four types of convolution operation. The feature plane 1205a is calculated by performing the above processing while scanning the entire image pixel by pixel. Similarly, the feature plane 1205b is calculated using four convolution operations using the kernels 12041b, 12042b, 12043b, and 12044b with respect to the four feature planes 1203a to d of the first layer 1208 which is the previous layer.

Furthermore, the feature plane 1207 is calculated using four convolution operations using the kernels 1261, 1262, 1263, and 1264 with respect to the four feature planes 1205a to d of the second layer 1209 which is the previous layer. It is assumed that each kernel coefficient is determined in advance by learning using general methods such as perceptron learning and back propagation learning.

When the CNN processing hardware for performing the CNN operation described above is implemented in an embedded system to perform network processing, the CNN processing hardware performs an arithmetic operation of input data and weighting coefficients for each layer. Then, an arithmetic operation result is made to be input data of the next layer, and an arithmetic operation with weighting coefficients of the next layer is repeated to obtain the final pattern recognition result.

The CNN processing needs an enormous number of product-sum operations to repeat a large number of convolution operations, and it is necessary for the CNN processing hardware to perform processing at high speed. In addition, a large-scale internal memory is also necessary to process a large-scale network, and power consumption becomes a problem.

As a method of achieving power saving without lowering processing speed, it is conceived that an arithmetic unit is always operated, and regarding the arithmetic unit and a data transfer control unit for performing input/output data transfer, a clock is controlled to turn on/off in accordance with data transmission and reception operation of the arithmetic unit.

Figure 14:
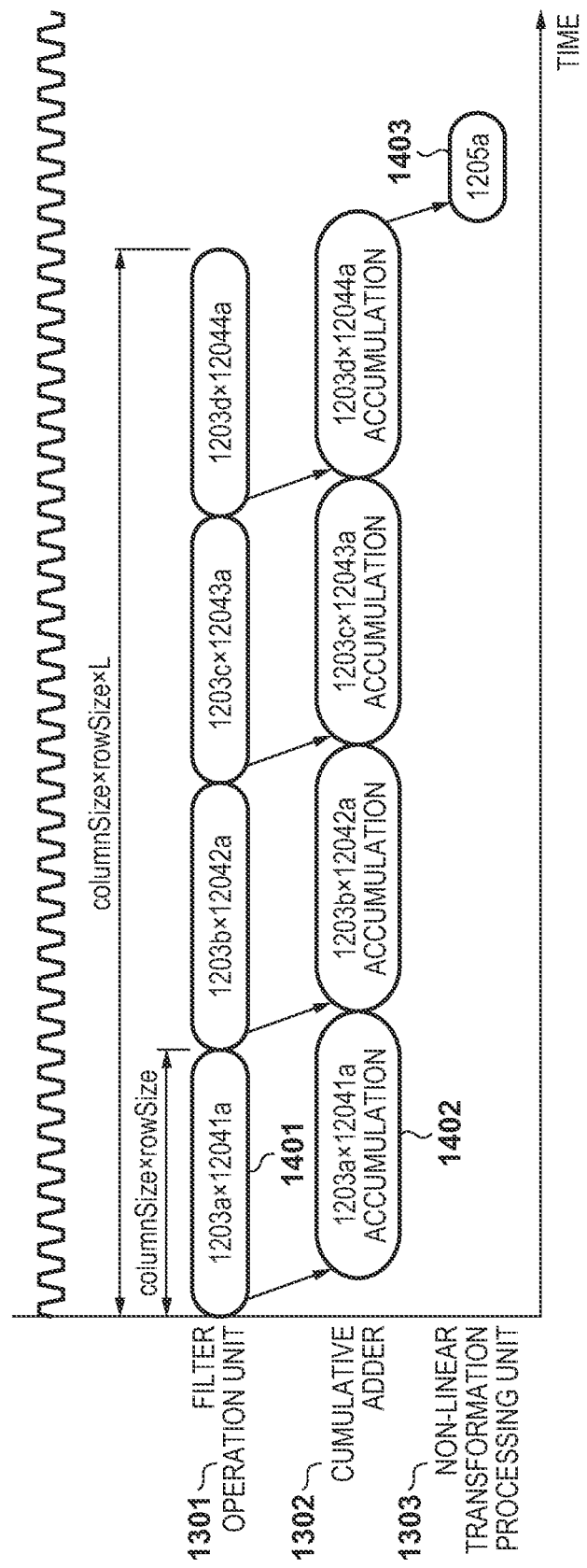

FIG. 14 is a diagram illustrating a time chart for explaining the operation for calculating the feature plane 1205a. In the drawing, the processing being performed by each of the filter operation unit 1301, the cumulative adder 1302, and the non-linear transformation processing unit 1303 is illustrated. Here, it is assumed that there is one filter operation unit 1301 in the CNN processing hardware and it performs filter operations on feature planes in a time division manner.

Furthermore, it is assumed that the filter operation unit 1301 takes one cycle for a product-sum operation of one pixel.

The filter operation unit 1301 performs a filter operation on the feature plane 1203*a* using the kernel 12041*a* (processing 1401). When the kernel size is columnSize×rowSize, the product-sum operation is performed columnSize×rowSize times. Therefore, columnSize×rowSize cycles are necessary for processing. The cumulative adder 1302 sequentially performs cumulative addition of a result of calculation by the filter operation unit 1301 (processing 1402).

The filter operation unit 1301 continues to sequentially perform filter operations using the kernels 12042*a* to 12044*a* for the feature planes 1203*b* to *d*, and the cumulative adder 1302 sequentially performs cumulative addition. When the result of the filter operation on the last feature plane of the previous layer is added, the non-linear transformation processing unit 1303 performs processing (processing 1403) to obtain the feature plane 1205*a*.

As described above, the feature plane of one pixel is obtained once in columnSize×rowSize×L cycles. Therefore, a clock need only be supplied to the arithmetic unit and the data transfer control unit for transferring input/output data only during a period in which it is necessary. Therefore, it is possible to expect efficient power saving by stopping and supplying a clock in cycle units of fine granularity.

<System Configuration>

Figure 11:
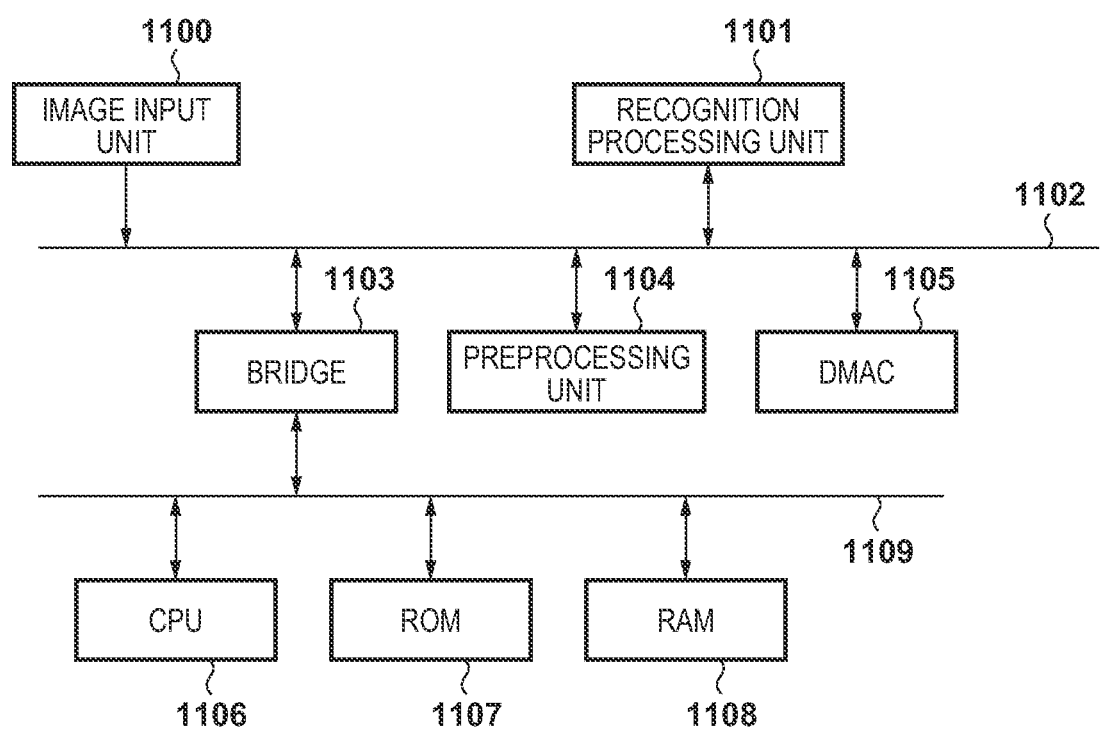
FIG. 11 is a diagram illustrating an overall configuration of the image processing system that uses the recognition processing unit.

FIG. 11 is a diagram illustrating an overall configuration of the image processing system that uses the recognition processing unit. The system has a function of detecting a region of a specific object from image data by performing pattern recognition.

An image input unit 1100 is a functional unit that inputs image data to be processed. The image input unit 1100 is, for example, an image capturing device and is configured by an optical system, a driver circuit for controlling a photoelectric conversion device and a sensor, an AD converter, a signal processing circuit for controlling various kinds of image correction, a frame buffer, and the like. The photoelectric conversion device and the sensor include CCDs (Charge-Coupled Devices), CMOSs (Complementary Metal Oxide Semiconductors), and the like.

A recognition processing unit 1101 is a functional unit that performs pattern recognition. Details of the recognition processing unit 1101 will be described later with reference to FIG. 1. A DMAC (Direct Memory Access Controller) 1105 is responsible for transferring data between each functional unit connected to an image bus 1102 and a CPU bus 1109. A bridge 1103 provides a bridge function for the image bus 1102 and the CPU bus 1109. A preprocessing unit 1104 performs various kinds of preprocessing for effectively performing pattern recognition processing. Specifically, image data conversion processing such as color conversion processing and contrast correction processing is processed by hardware.

A CPU 1106 controls the operation of the entire image processing system. A ROM (Read Only Memory) 1107 stores instructions and operation parameter data that define the operation of the CPU 1106 and a data set for operating the recognition processing unit 1101. Here, the data set includes operation parameters and weight coefficients that accord with the neural network. The data set is inputted to the recognition processing unit 1101 via the DMAC 1105. A RAM 1108 is a working memory that is necessary for the operation of the CPU 1106, for example.

Image data inputted from the image input unit 1100 is processed by the preprocessing unit 1104 and temporarily stored in the RAM 1108. Thereafter, the image data is inputted from the RAM 1108 to the recognition processing unit 1101 via the DMAC 1105. When a data set is received, the recognition processing unit 1101 performs predetermined determination processing on the inputted preprocessed image data in pixel units to determine a region of a predetermined object in the input image. The result of the determination is stored in the RAM 1108 via the DMAC 1105.

<Configuration of Recognition Processing Unit>

FIG. 1 is a block diagram of the recognition processing unit 1101 according to the first embodiment. A control unit 101 controls the entire recognition processing unit 1101. Furthermore, the control unit 101 includes a network information holding unit 1011 for holding network information. As described above, the network information is set by the DMAC 1105 transferring the operation parameters placed in advance in the ROM 1107. The network information includes, for example, the number of layers to be processed, a layer number, information on feature planes for each layer (the width and height of a feature plane, the number of feature planes, and the like), and information on connections between layers (the horizontal size and the vertical size of a convolution kernel and the like).

The control unit 101 also includes an enable register as a register for operation control, and the CPU 1106 instructs a start of processing. The CPU 1106 instructs the control unit 101 to start processing of a plurality of layers, and the control unit 101 instructs the feature plane storage unit 102 and the convolution operation unit 104 to be described later to start processing in layer units a plurality of times. The control unit 101 transmits, as a control parameter, data that has been set in the network information holding unit 1011 together with a control signal that indicates a processing start instruction. When performing post-processing on the generated feature planes of a layer, the control unit 101 transmits, as a control parameter, the data that has been set in the network information holding unit 1011 to the CPU 105 after the processing in layer units has been completed in the feature plane storage unit 102 and the convolution operation unit 104. Then, an instruction to start post-processing is issued.

The feature plane storage unit 102 has a feature plane holding unit 1021 for storing feature planes. Furthermore, the feature plane storage unit 102 includes a data transmission unit 1022 that reads a feature plane from the feature plane holding unit 1021 and transmits it to the convolution operation unit 104 and a data reception unit 1023 that receives an arithmetic operation result of the convolution operation unit 104 and stores it in the feature plane holding unit 1021.

The feature plane holding unit 1021 is configured by, for example, a dual port SRAM, so that reading by the data transmission unit 1022 and storage by the data reception unit 1023 can be performed simultaneously.

The data transmission unit 1022 reads and transmits a feature plane referenced by the convolution operation unit 104 from the feature plane holding unit 1021 based on a control parameter (that is, hierarchical network information) received from the control unit 101. A clock is supplied by a clock control unit 103 to be described later. The data transmission unit 1022 instructs the clock control unit 103 to stop the clock and gives it a count value for controlling an interval from the stop to re-supply of the clock.

The data reception unit 1023 receives as a feature plane an arithmetic operation result outputted by the convolution operation unit 104 based on a control parameter (that is, hierarchical network information) received from the control unit 101 and then stores it in the feature plane holding unit 1021. When all the feature planes are received, the data reception unit 1023 notifies the control unit 101 of the completion. A clock is supplied by the clock control unit 103 to be described later. The data reception unit 1023 instructs the clock control unit 103 to stop the clock and gives it a count value for controlling an interval from the stop to re-supply of the clock (that is, a period during which the supply is stopped).

The clock control unit 103 supplies operation clocks to the data transmission unit 1022 and the data reception unit 1023. The clock control unit 103 includes a reception timer 1032 used for clock control of the data reception unit 1023 and a transmission timer 1031 used for clock control of the data transmission unit 1022.

The clock control unit 103 stops supplying a clock when a stop instruction and a count value are received from the data transmission unit 1022 and starts counting with the transmission timer 1031. The clock control unit 103 re-supplies the clock once it has counted to the count value received from the data transmission unit 1022 and sets the transmission timer 1031 to an initial state.

Similarly, the clock control unit 103 stops supplying a clock when a stop instruction and a count value are received from the data reception unit 1023 and starts counting with the reception timer 1032. The clock control unit 103 re-supplies the clock once it has counted to the count value received from the data reception unit 1023 (the count value received from the data reception unit 1023 has expired) and sets the reception timer 1032 to an initial state.

Figure 2:
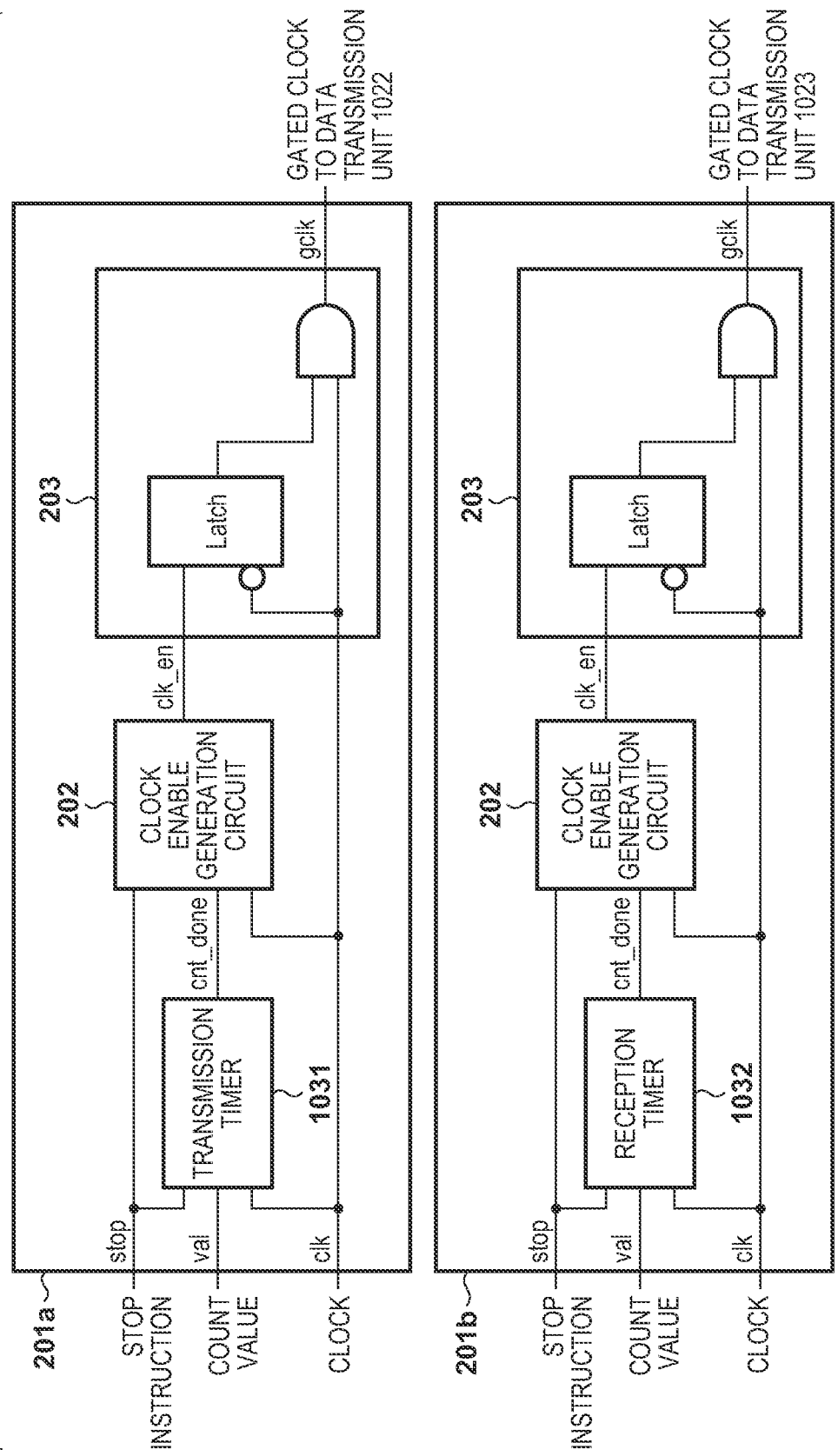
FIG. 2 is a diagram illustrating a circuit configuration of a clock control unit.

FIG. 2 is a diagram illustrating a circuit configuration of the clock control unit 103. A circuit 201*a* is a circuit for controlling the clock of the data transmission unit 1022. A circuit 201*b* is a circuit for controlling the clock of the data reception unit 1023. Since the configuration and operation of the circuit 201*a* and the circuit 201*b* are substantially the same, in the following, a description will be made only on the circuit 201*a*.

The transmission timer 1031 starts counting when a stop instruction pulse signal (stop) is received from the data transmission unit 1022. When the count reaches the count value (val) specified by the data transmission unit 1022, a count completion pulse signal (cnt_done) is asserted, the counting is stopped, and the count is returned to an initial value.

A clock enable generation circuit 202 disables a clock enable signal (clk_en) when a stop is received from the data transmission unit 1022. Furthermore, the clock enable generation circuit 202 enables a clock enable signal (clk_en) when cnt_done is received from the transmission timer 1031. A circuit 203 is a clock gating circuit of a general configuration and turns on the clock when clk_en is 1 and turns off the clock when clk_en is 0.

Figure 3:
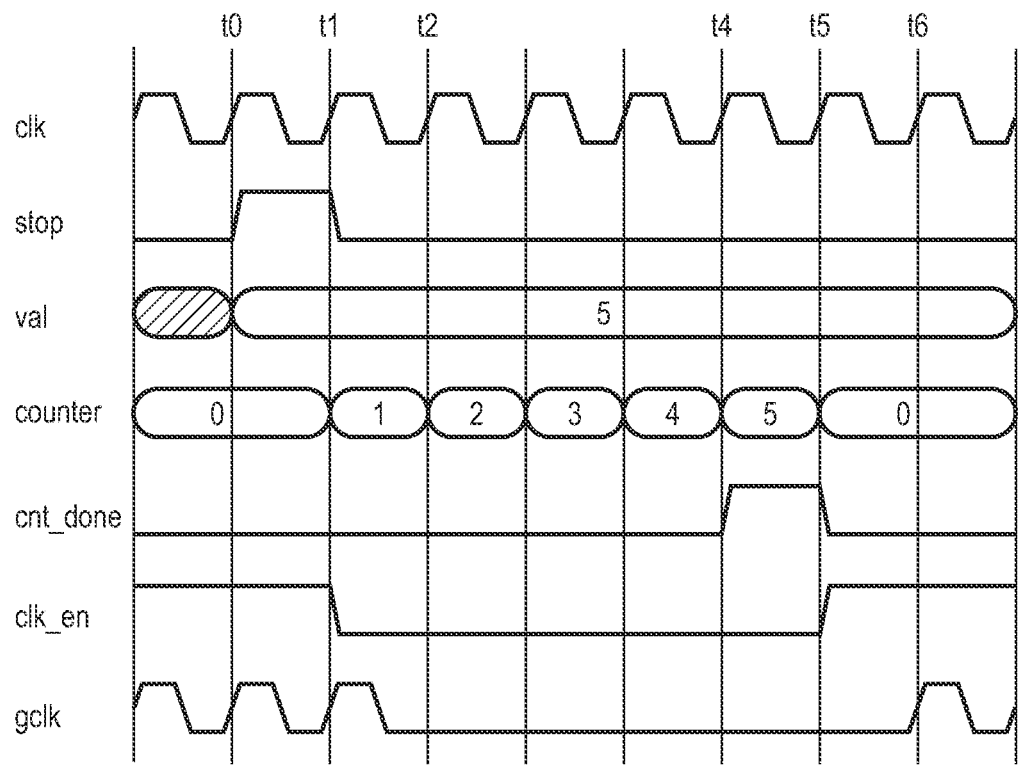
FIG. 3 is a diagram illustrating a timing chart of a circuit of the clock control unit.

FIG. 3 is a diagram illustrating a timing chart of the circuit 201*a* of the clock control unit 103. The transmission timer 1031 sets the stop instruction signal stop to "1" at t0 and the count value val is set to, for example, "5". The transmission timer 1031 increments an internal counter value counter every cycle starting from t1 and the internal counter value counter matches val "5" at t4. Therefore, the transmission timer 1031 asserts cnt_done at t4. Then, the transmission timer 1031 sets a counter value counter to an initial state at t5 and deasserts cnt_done.

The clock enable generation circuit 202 sets clk_en to "0" at t1 when stop is asserted. When clk_en is set to "0", a gated clock gclk stops the clock in the next cycle (that is, t2). Moreover, when cnt_done is asserted at t4, clk_en is set to "1" at t5, and gclk re-supplies the clock at the next cycle (that is, t6). A clock stop cycle has five cycles (from t2 to t5) in accordance with the count value val. That is, the clock stop cycle can be controlled by the count value val.

The convolution operation unit 104 is a functional unit for performing a convolution operation. Weighting coefficients that accord with a kernel size and a reference feature plane are taken as input, and a feature plane is outputted as an arithmetic operation result. Here, it is assumed that the DMAC 1105 transfers to the convolution operation unit 104 the weighting coefficients placed in advance in the ROM 1107. The convolution operation unit 104 receives a kernel size as a control parameter from the control unit 101 and, when instructed to start processing, performs convolution operation processing, cumulative addition processing, and non-linear transformation processing. When the arithmetic operation processing of all the feature planes of a layer to be generated is completed, the completion is notified to the control unit 101. As described above, in the present embodiment, it is assumed that it takes one cycle for a convolution operation of one pixel. Therefore, it takes columnSize× rowSize cycles to process a feature plane with a kernel size columnSize×rowSize.

Figure 4:
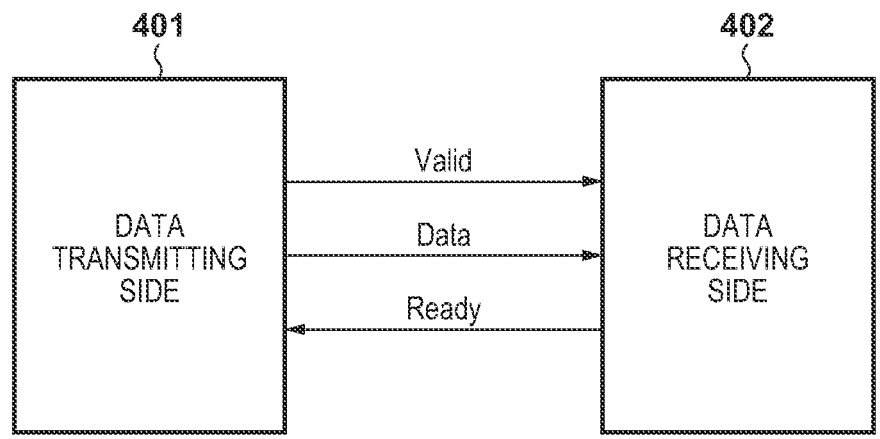
FIG. 4 is a diagram illustrating a two-wire handshake.

A two-wire handshake can be utilized for data transfer between the convolution operation unit 104 and the feature plane storage unit 102. FIG. 4 is a diagram illustrating data transmission by a two-wire handshake.

A data transmitting side 401 sets data to be transmitted to a data line Data when it is ready for data transmission and sets a Valid signal that indicates that data transmission is in progress to "1". A data receiving side 402 sets a Ready signal that indicates that reception is possible to "1" when it is ready to receive data. Data is transferred when both the Valid signal and the Ready signal are "1".

Figure 5:
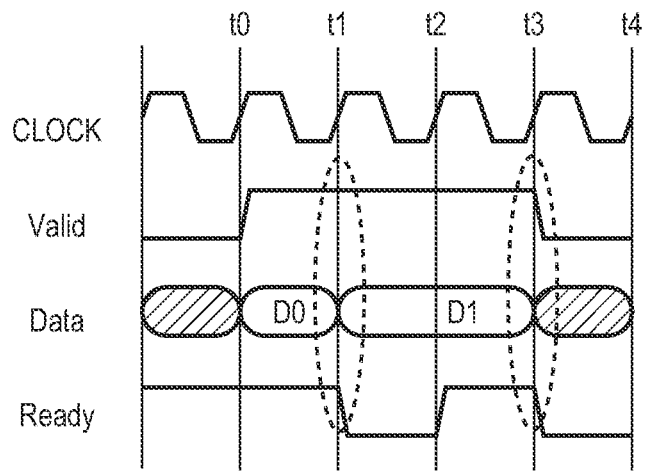
FIG. 5 is a diagram illustrating a timing chart of the two-wire handshake.

FIG. 5 is a diagram illustrating a timing chart of the two-wire handshake. The data transmitting side 401 starts transmitting data D0 at t0. Ready of the data receiving side 402 is "1", and the transfer of the data D0 is completed at t1. The data transmitting side 401 further attempts to transmit the next data D1, but since Ready of the data receiving side 402 is "0", the transfer is unsuccessful at t2, and the data transmitting side 401 further continues data transmission. The data receiving side 402 sets Ready to "1" with the clock at t2, and the transfer of the data D1 is completed at 3.

Figure 6:
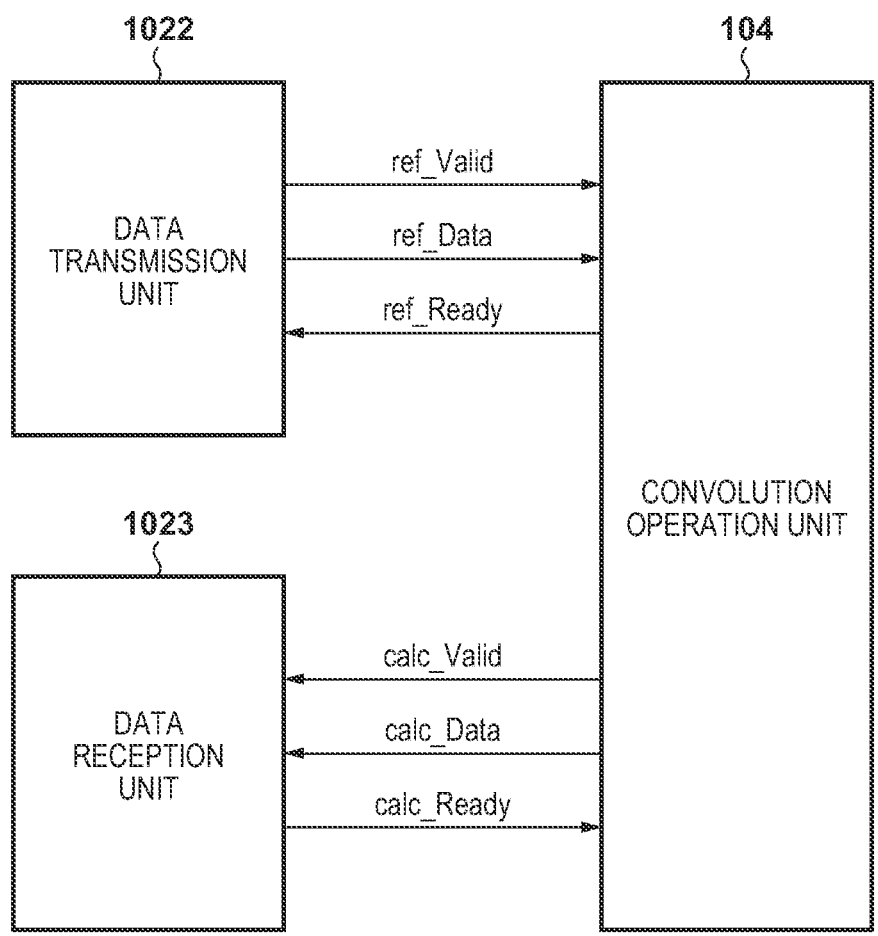
FIG. 6 is a diagram illustrating signals between a convolution operation unit 104 and a feature plane storage unit 102.

FIG. 6 is a diagram illustrating signals between the convolution operation unit 104 and the feature plane storage unit 102. Here, each of the data transmission unit 1022 and the data reception unit 1023 in the feature plane storage unit 102 performs data transmission by a two-wire handshake with the convolution operation unit 104.

That is, in the data transfer of a reference feature plane from the data transmission unit 1022 to the convolution operation unit 104, the data transmission unit 1022 controls a Valid signal (ref_Valid) and a Data signal (ref_Data). Furthermore, the convolution operation unit 104 controls a Ready signal (ref_Ready). The data width of ref_Data is a data width for reference pixels (columnSize×rowSize pixels) that are necessary for a convolution operation of the kernel size columnSize×rowSize to be capable of being transferred in one cycle.

Furthermore, in the data transfer of an arithmetic operation result from the convolution operation unit 104 to the data reception unit 1023, the convolution operation unit 104 controls a Valid signal (calc_Valid) and a Data signal (calc_Data). Moreover, the data reception unit 1023 controls a Ready signal (calc_Ready). The data width of calc_Data is a data width for one pixel of a feature plane to be capable of being transferred in one cycle.

A CPU 105 performs the post-processing of a feature plane. The CPU 105 is a bus master of the image bus 1102, and in a memory space, a memory of the feature plane holding unit 1021 is address-mapped via a memory control unit 106 to be described later. The CPU 105 acquires data when a processing start instruction is received from the control unit 101 and performs processing.

The memory control unit 106 controls reading and writing of the memory of the feature plane holding unit 1021. The memory control unit 106 is a bus slave of the image bus 1102, receives a request from the bus master, and reads and writes the feature plane holding unit 1021.

<Apparatus Operation>

Figure 7:
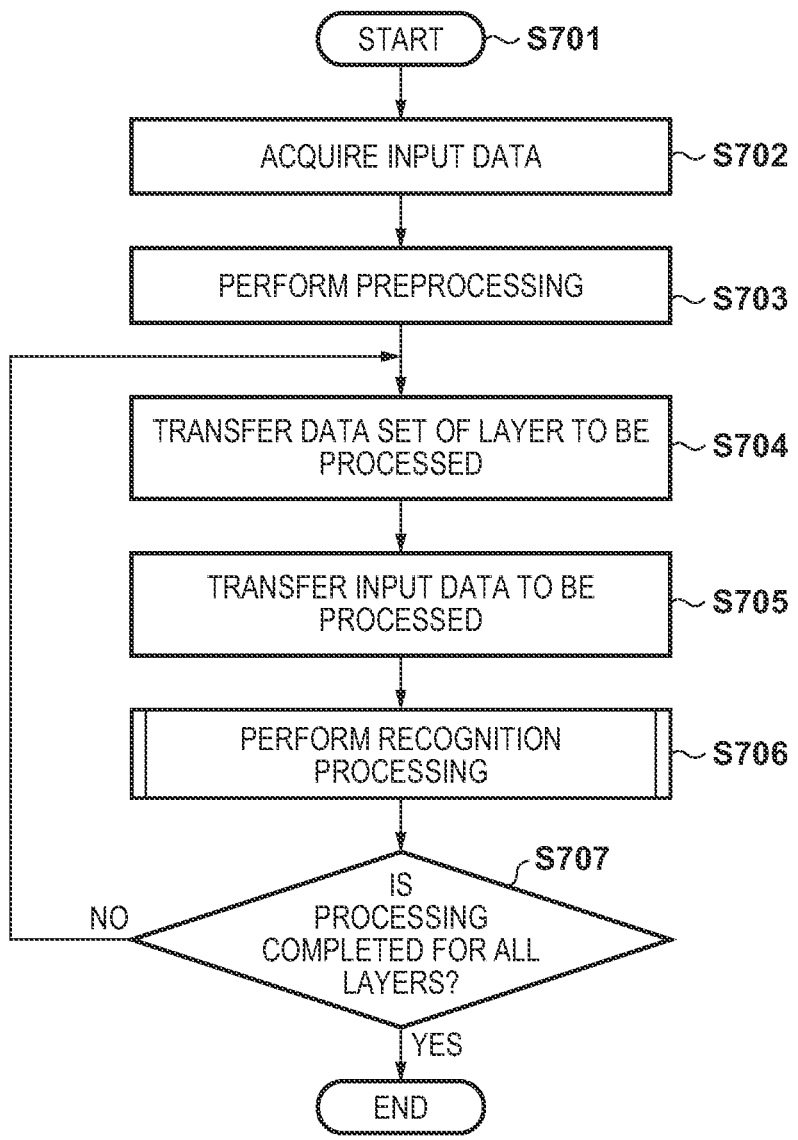
FIG. 7 is a flowchart for explaining overall operation of an image processing system.

FIG. 7 is a flowchart for explaining the overall operation of the image processing system. The following operation is performed, for example, by the CPU 1106 executing a control program.

In step S701, the CPU 1106 starts processing of the system. In step S702, the CPU 1106 acquires input data via the image input unit 1100. In step S703, the CPU 1106 performs preprocessing on the acquired data via the preprocessing unit 1104 and stores the result in the RAM 1108.

In step S704, the CPU 1106 sets a start position address of a data set of a layer to be processed placed in the ROM 1107 to the DMAC 1105 and activates the DMAC 1105. One or more layers may be processed. In step S705, the CPU 1106 sets a start position address of preprocessed data in the RAM 1108 to the DMAC 1105 activates the DMAC 1105.

In step S706, the CPU 1106 activates the recognition processing unit 1101 and performs recognition processing. When the processing of the recognition processing unit 1101 is completed, the processing result (a detection result or feature data of a middle layer) is stored in the RAM 1108.

In step S707, the CPU 1106 determines whether or not processing of all the layers is completed. When the processing of all layers is completed (Yes), the processing is terminated, and when the processing is not completed (No), the processing returns to step S704. For example, in a small network for embedded devices, it is possible to process all the layers at once, and therefore, it may be Yes in step S707 of the first loop. Meanwhile, in the processing of a large neural network, all the layers cannot be processed at once, and therefore, the network is processed in a time division manner. In such a case, it becomes No in step S707 of the first loop, the processing returns to step S704 again, and the processing of the remaining layers is performed. The processing in step S705 in the second and subsequent loops sets the processing result of the recognition processing unit 1101 stored in the RAM 1108 as the processing target.

Figure 8:
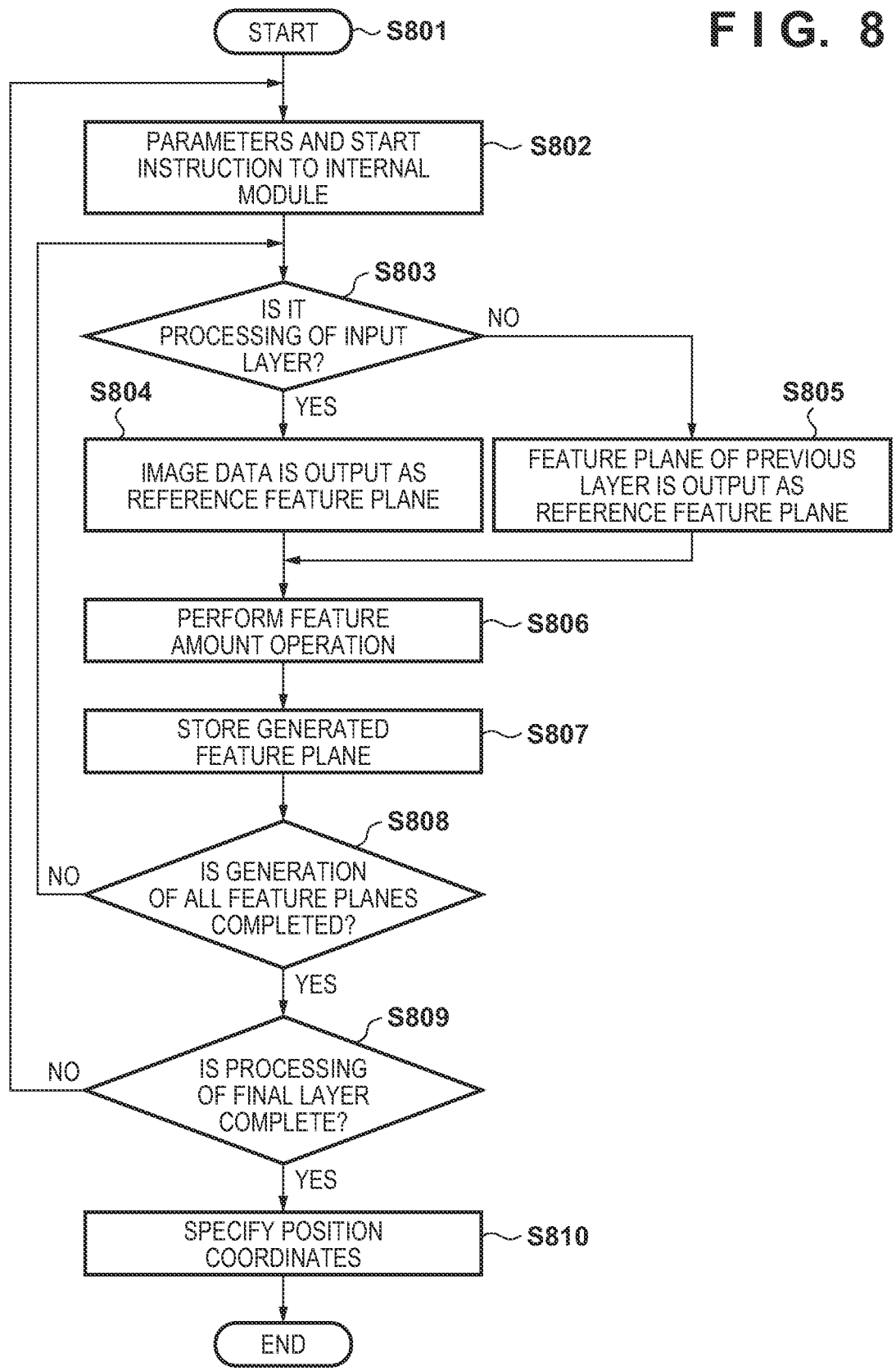
FIG. 8 is a flowchart for explaining detailed operation of the recognition processing unit.

FIG. 8 is a flowchart illustrating detailed operation (step S706) of the recognition processing unit 1101. The following operation of each unit in the recognition processing unit 1101 is controlled by, for example, the control unit 101. At the time of completion of step S705, information on the layer that is a processing target of the recognition processing unit 1101 is set in the network information holding unit 1011. In step S801, the recognition processing unit 1101 starts processing.

In step S802, the control unit 101 transmits the information held in the network information holding unit 1011 to the feature plane storage unit 102 and the convolution operation unit 104 and issues a processing start instruction. Here, it is assumed that the information held in the network information holding unit 1011 is transmitted as a control parameter in units of layers.

In step S803, the feature plane storage unit 102 determines whether or not it is the processing of an input layer. If it is the processing of an input layer (Yes), the processing proceeds to step S804, and if it is not the processing of an input layer (No), the processing proceeds to step S805. In step S804, the data transmission unit 1022 outputs image data that is input data as a reference feature plane. In step S805, the data transmission unit 1022 reads a feature plane of the previous layer from the feature plane holding unit 1021 and outputs it as a reference feature plane.

In step S806, the convolution operation unit 104 performs a convolution operation based on the reference feature plane and weight coefficients and transmits an arithmetic operation result to the feature plane storage unit 102. In step S807, the data reception unit 1023 of the feature plane storage unit 102 stores the arithmetic operation result in the feature plane holding unit 1021.

In step S808, the feature plane storage unit 102 determines whether or not generation of all the feature planes is completed. When the generation of all the feature planes is completed (Yes), the feature plane storage unit 102 and the convolution operation unit 104 issues a completion notification to the control unit 101 and proceeds to step S809. If not completed (No), the processing returns to step S803 and the next feature plane is generated.

In step S809, when the completion notification is received, the control unit 101 determines whether or not the processing of the final layer is completed. If the processing of the final layer is completed (Yes), the processing proceeds to step S810. If the processing of the final layer is not completed (No), the control unit 101 instructs the processing of the next layer and returns to step S802.

In step S810, the control unit 101 notifies the network information such as a final layer number to the CPU 105. Based on the network information, the CPU 105 reads the feature plane data of the final layer and specifies position coordinates.

FIG. 9 is a flowchart of clock control. In the following, the operation in data transmission from the data transmission unit 1022 to the convolution operation unit 104 and the operation in data transmission from the convolution operation unit 104 to the data reception unit 1023 will be described with reference to FIG. 9.

First, the clock control of the data transmission unit 1022 in a step (step S805) in which the data transmission unit 1022 reads a feature plane of the previous layer from the feature plane holding unit 1021 and outputs it as a reference feature plane will be described. As described above, step S805 is the processing of outputting a reference feature plane of the previous layer in the processing of generating one feature plane. When there are a plurality of feature planes of the previous layer, a plurality of planes are repeatedly outputted. Data transfer is performed using the ref_Valid, ref_Data, and ref_Ready signals illustrated in FIG. 6.

In step S901, the data transmission unit 1022 starts processing. In step S902, the data transmission unit 1022 asserts ref_Valid and starts data transfer of the reference feature plane. In step S903, the data transmission unit 1022 determines whether the transfer is successful. If ref_Ready is "1", it is determined that the transfer is successful, and the processing proceeds to step S904. Meanwhile, if it is "0", it is determined that the transfer is not successful, and the processing proceeds to step S905. In step S904, the data transmission unit 1022 determines whether the transfer of the final data is completed. If the transfer of the final data is completed (Yes), the processing is terminated. If the transfer of the final data is not completed (No), the processing returns to step S902 and data transfer is continued.

In step S905, the data transmission unit 1022 determines whether to implement clock control based on a clock control implementation criterion to be described later. If it is determined to not carry out implementation (No), the processing returns to step S902 and data transfer is continued. If it is determined to carry out implementation (Yes), the processing proceeds to step S906.

In step S906, the data transmission unit 1022 sets the transfer signal ref_Valid to "0", and transition is made to a state in which no further transfer is performed. In step S907, the data transmission unit 1022 sets a count value to be transferred to the clock control unit 103 and issues a clock stop instruction. In step S908, the data transmission unit 1022 waits for the re-supply of the clock.

In step S909, when the clock control unit 103 receives the clock stop instruction, the transmission timer 1031 starts counting. Furthermore, the clock enable generation circuit 202 disables the clock enable signal and stops supplying the clock.

In step S910, the transmission timer 1031 continues to count until a count value specified by the data transmission unit 1022 is reached. In step S911, the transmission timer 1031 stops counting when the count value is reached and asserts the count completion pulse signal (cnt_done). Furthermore, the clock enable generation circuit 202 enables the clock enable signal and re-supplies the clock.

In step S912, after the re-supply of the clock, the data transmission unit 1022 starts data transfer and waits for the transfer to be successful. When the transfer is successful, the processing proceeds to step S904, and it is determined whether or not the transfer of the final data is completed.

As the clock control implementation criterion used in the determination in step S905 described above, it is possible to use a comparison between the number of time lag cycles and the number of processing cycles. Here, the number of time lag cycles is the sum of the number of cycles from when it is determined that the transfer has failed in step S903 until the clock supply is stopped and the number of cycles from when the count value is reached in step S910 until the clock is re-supplied and the transfer is started. Furthermore, the number of processing cycles is the number of cycles it takes for the convolution operation unit 104 to process one reference feature plane and then request for the next reference feature plane. When the number of processing cycles exceeds the number of time lag cycles T, it is assumed that the clock is controllable without processing time overhead and "clock control is implemented".

For example, assuming that the convolution kernel size is columnSize×rowSize, when the number of processing cycles is columnSize×rowSize>T, clock control is implemented. The number of time lag cycles T may include a cycle of processing that has been performed during the data transfer waiting time such as processing for the next data transfer preparation that is performed after the data transfer is successful. In order to reduce the processing time overhead and achieve better power saving effect, columnSize×rowSize−T should be set as the count value in step S907.

Next, the clock control of the data reception unit 1023 in the steps in which the convolution operation unit 104 transmits the arithmetic operation result to the data reception unit 1023 (step S806) and the data reception unit 1023 stores the arithmetic operation result in the feature plane holding unit 1021 (step S807) will be described. As described above, step S806 is the processing of outputting a cumulative addition result of all the feature planes of the previous layer in the processing of generating one feature plane. Data transfer is performed using the calc_Valid, calc_Data, and calc_Ready signals illustrated in FIG. 6.

In step S901, the data reception unit 1023 starts processing. In step S902, the data reception unit 1023 asserts calc_Ready and waits for data transfer of the arithmetic operation result. In step S903, the data reception unit 1023 determines whether the transfer is successful. If calc_Valid is "1", it is determined that the transfer is successful, and the processing proceeds to step S904. Meanwhile, if it is "0", it is determined that the transfer is not successful, and the processing proceeds to step S905. In step S904, the data reception unit 1023 determines whether the transfer of the final data is completed. If the transfer of the final data is completed (Yes), the processing is terminated. If the transfer of the final data is not completed (No), the processing returns to step S902 and data transfer is continued.

In step S905, the data reception unit 1023 determines whether to implement clock control based on a clock control implementation criterion to be described later. If it is determined to not carry out implementation (No), the processing returns to step S902 and data transfer is continued. If it is determined to carry out implementation (Yes), the processing proceeds to step S906.

In step S906, the data reception unit 1023 sets the transfer signal calc_Ready to "0", and transition is made to a state in which no further transfer is performed. In step S907, the data reception unit 1023 sets a count value to be transferred to the clock control unit 103 and issues a clock stop instruction. In step S908, the data reception unit 1023 waits for the re-supply of the clock.

In step S909, when the clock control unit 103 receives the clock stop instruction, the reception timer 1032 starts counting. Furthermore, the clock enable generation circuit 202 disables the clock enable signal and stops supplying the clock.

In step S910, the reception timer 1032 continues to count until a count value specified by the data reception unit 1023 is reached. In step S911, the reception timer 1032 stops counting when the count value is reached and asserts the count completion pulse signal (cnt_done). Furthermore, the clock enable generation circuit 202 enables the clock enable signal and re-supplies the clock.

In step S912, after the re-supply of the clock, the data reception unit 1023 starts data transfer and waits for the transfer to be successful. When the transfer is successful, the processing proceeds to step S904, and it is determined whether or not the transfer of the final data is completed.

As the clock control implementation criterion used in the determination in step S905 described above, it is possible to use a comparison between the number of time lag cycles and the number of processing cycles. Here, the number of time lag cycles is the sum of the number of cycles from when it is determined that the transfer has failed in step S903 until the clock supply is stopped and the number of cycles from when the count value is reached in step S910 until the clock is re-supplied and the transfer is started. Furthermore, the number of processing cycles is the number of cycles it takes for the convolution operation unit 104 to generate one feature plane until generation of the next feature plane. When the number of processing cycles exceeds the number of time lag cycles T, it is assumed that the clock is controllable without processing time overhead and "clock control is implemented".

For example, if the convolution kernel size is column-Size×rowSize and the number of feature planes of the previous layer is L, the clock control is implemented when the number of processing cycles is L×columnSize×rowSize>T. The number of time lag cycles T may include a cycle of processing that has been performed during the data transfer waiting time such as processing for the next data transfer preparation that is performed after the data transfer is successful. In order to reduce the processing time overhead and achieve better power saving effect, L×columnSize×rowSize−T should be set as the count value in step S907.

Figure 10A:
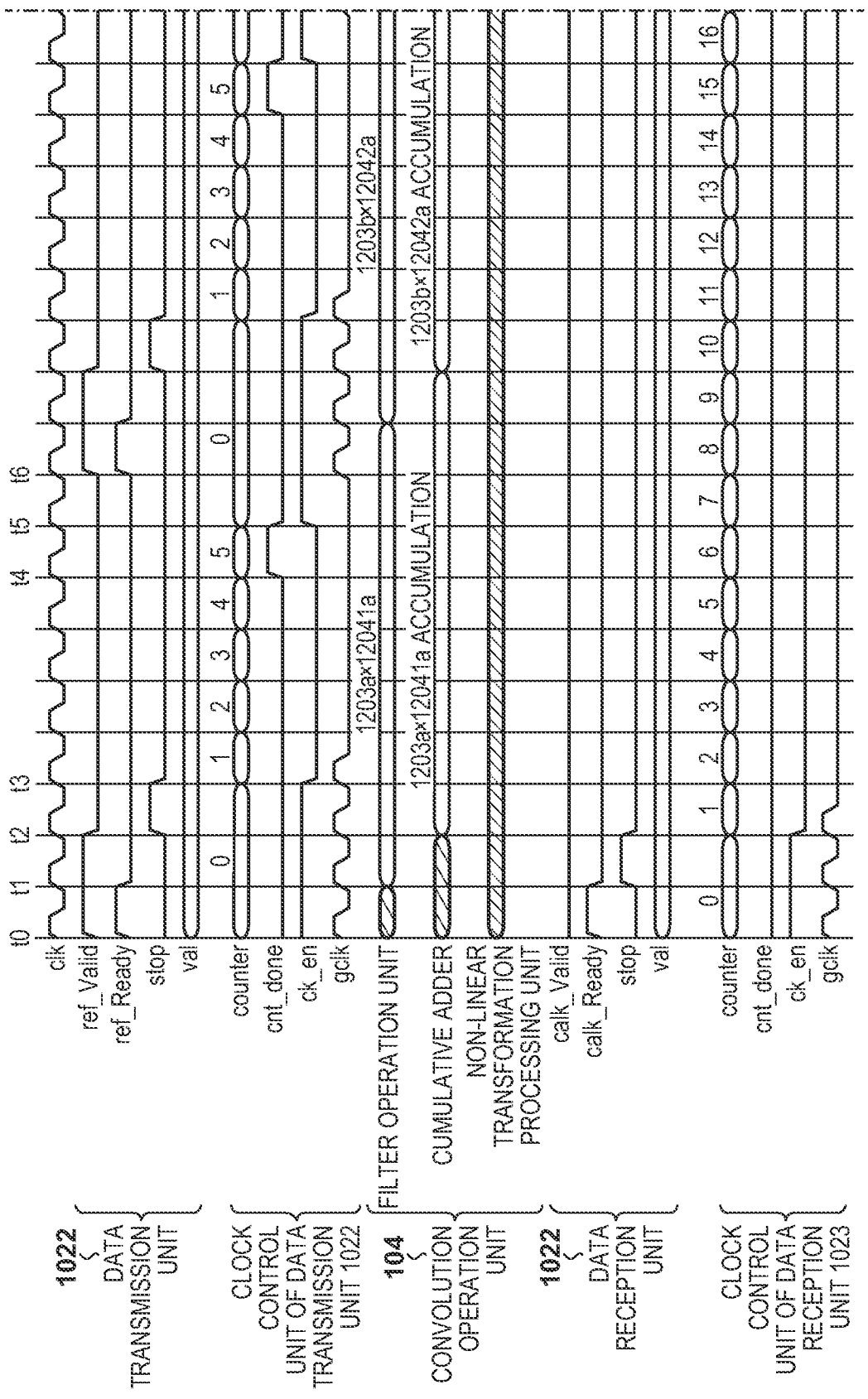
FIGS. 10A and 10B are diagrams illustrating a timing chart for explaining clock control at the time of feature plane generation.
Figure 10B:
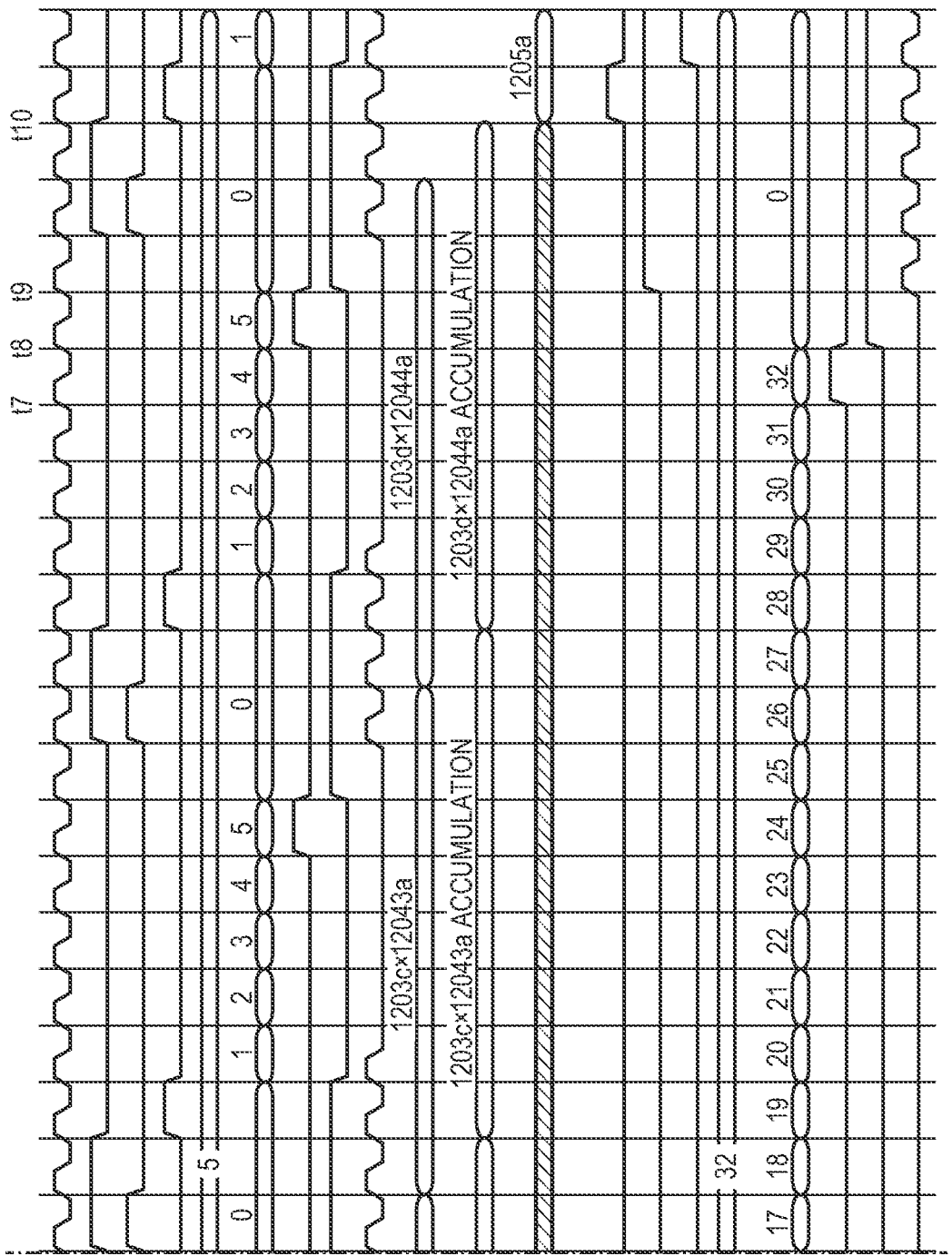

FIGS. 10A and 10B are diagrams illustrating a timing chart for explaining clock control at the time of feature plane generation. More specifically, it is a timing chart illustrating the operation of clock control of the data transmission unit 1022 and the data reception unit 1023 for when the feature plane 1205a of FIG. 13 is generated in FIG. 1. The convolution kernel size of the feature plane 1205a is 3×3. The feature planes 1203a, 1203b, 1203c, and 1203d are sequentially inputted and processed to generate the feature plane 1205a.

In the present embodiment, the number of cycles from when it is determined that the transfer has failed in step S903 until the clock supply is stopped is "2" cycles and the number of cycles from when the count value is reached in step S910 until the clock is re-supplied and the transfer is started is "2" cycles. That is, the number of time lag cycles is "4" cycles.

At t0, when the feature plane storage unit 102 receives a processing start instruction (step S802), the data transmission unit 1022 starts data transfer. At t0, the data transmission unit 1022 asserts ref_Valid (step S902) and the convolution operation unit 104 asserts ref_Ready, and thereby, the transfer of the feature plane 1203a is successful.

At t1, the convolution operation unit 104 starts processing using the transferred data. When the convolution operation unit 104 negates ref_Ready, transfer fails (step S903), and clock control implementation is determined (step S905). Here, the number of processing cycles is 3×3=9 cycles and the number of time lag cycles is 4 cycles, and therefore, it is determined to "implement clock control".

At t2, the data transmission unit 1022 negates ref_Valid (step S906), asserts the clock stop instruction stop, and issues a clock stop instruction (step S907). At this time, the data transmission unit 1022 provides 3×3−4=5 as the counter value to the transmission timer 1031.

At t3, clk_en=0 due to the clock stop instruction, and the clock of the data transmission unit 1022 is stopped. The transmission timer 1031 starts counting, reaches the count value at t4, and asserts the count completion pulse signal cnt_done.

At t5, clk_en=1 due to the count completion pulse signal, and the clock of the data transmission unit 1022 is re-supplied (step S911). When the clock is re-supplied, at t6, ref_Valid is asserted and the transfer of the feature plane 1203b is started (step S912).

Similarly to the transfer of the feature plane 1203b described above, the feature planes 1203c and 1203d are also transferred while the clock is turned on and off.

Furthermore, at t0, when the feature plane storage unit 102 receives a processing start instruction (step S802), the data reception unit 1023 also starts data reception. At t0, the data reception unit 1023 asserts calc_Ready (step S902), and, since there is yet to be an arithmetic operation result at the convolution operation unit 104, the data reception unit 1023 deasserts calc_Valid. The transfer fails (step S903), and implementation of clock control is determined (step S905). Here, the number of processing cycles is 4×3 3=36 cycles and the number of time lag cycles is 4 cycles, and therefore, it is determined to "implement clock control".

At t1, the data reception unit 1023 negates calc_Ready (step S906), asserts the clock stop instruction stop, and issues a clock stop instruction (step S907). At this time, the data reception unit 1023 provides 4×3×3−4=32 as the counter value to the reception timer 1032.

At t2, clk_en=0 due to the clock stop instruction, and the clock of the data reception unit 1023 is stopped. The reception timer 1032 starts counting, reaches the count value at t7, and asserts the count completion pulse signal cnt_done.

At t8, clk_en=1 due to the count completion pulse signal, and the clock of the data reception unit 1023 is re-supplied (step S911). When the clock is re-supplied, at t9, calc_Ready is asserted and the reception of the feature plane 1205a is started (step S912).

At t10, the convolution operation unit 104 asserts calc_Valid and outputs data, and the data transfer of the feature plane 1205a is completed.

According to the first embodiment as described above, clock control is performed in the data transfer from the data transmission unit 1022 to the convolution operation unit 104, and in the data transfer from the convolution operation unit 104 to the data reception unit 1023. More specifically, when the transfer fails, an interface is transitioned to a state in which transfer is not performed and a clock stop instruction is issued to the clock control unit 103. By this, it becomes unnecessary to perform a time-consuming procedure, and it becomes possible to obtain a better power saving effect in the data transmission unit 1022 and the data reception unit 1023.

Furthermore, when a clock stop instruction is issued to the clock control unit 103, by providing a count value that accords with the network information of the convolution operation unit 104, the clock control unit 103 can re-supply the clock at a suitable timing. That is, by re-supplying the clock based on a provided count value and resuming the data transfer processing, the clock control unit 103 can reduce processing time overhead.

In the present embodiment, a description that a power saving effect is obtained with respect to data transfer has been given; however, the effect of reducing the power consumption of a memory is also obtained. That is, it also becomes possible to cope with the problem that, in a large-scale network, memory capacity increases and the power consumption by a memory increases. That is, by connecting the clock of the data transmission unit 1022 to a memory for reading transmission data or connecting the clock of the data reception unit 1023 to a memory for storing received data, a better power saving effect is obtained.

The unit to which the clock is connected is not limited to a memory. That is, the clock of the data transmission unit 1022 may be connected to another unit involved in data transmission and the clock of the data reception unit 1023 may be connected to another unit involved in data reception.

<Variation>

Although in the above-described embodiment the description has been given on the case of using a two-wire handshake for data transfer, another data transfer may be utilized. For example, the present disclosure can be applied to a protocol that responds to a transfer request.

Furthermore, in the above embodiment, the description has been given on the case of the CNN operation processing as the feature extraction processing; however, another arithmetic operation processing may be utilized. For example, the present disclosure can be applied to other various hierarchical processing such as perceptrons.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-113135, filed Jul. 7, 2021 which is hereby incorporated by reference herein in its entirety.

What is claimed is:

1. An information processing apparatus comprising:
one or more memories storing instructions; and
one or more processors executing the instructions to cause the information processing apparatus to function as:
an arithmetic unit that performs arithmetic operation processing using a hierarchical network;
a storage unit that stores input data inputted to the arithmetic unit and output data outputted from the arithmetic unit;
a transmission unit that transmits to the arithmetic unit the input data stored in the storage unit;
a reception unit that receives and stores in the storage unit the output data from the arithmetic unit; and
a control unit that controls, in a case where the input data cannot be transmitted from the storage unit to the arithmetic unit, supply of an operation clock to the transmission unit based on network information that indicates a structure of the hierarchical network,
wherein the hierarchical network is a CNN (Convolutional Neural Network),
wherein the arithmetic operation processing includes convolution operation processing on the input data,
the network information includes at least one of a size of a convolution kernel that is used in the convolution operation processing on the input data and the number of feature planes,
wherein the control unit includes:
a determination unit that determines, in a case where it is not possible to transfer the input data, whether or not to stop supply of the operation clock to the transmission unit based on the network information;
a setting unit that sets, in a case where it is determined by the determination unit to stop supply of the operation clock to the transmission unit, a first period in which supply of the operation clock is stopped based on the network information; and
a clock control unit that stops supply of the operation clock to the transmission unit in the first period and, after the first period has expired, resumes supply of the operation clock to the transmission unit,
wherein the determination unit calculates, based on the network information, a number of first cycles from when the arithmetic unit processes one input data until when the arithmetic unit requests for the next input data and, in a case where the number of first cycles is larger than a number of second cycles that is a sum of the number of cycles for stop of clock supply to the transmission unit by the clock control unit and the number of cycles for resumption of data transmission by resumption of clock supply, determines to stop supply of the operation clock to the transmission unit.

2. The information processing apparatus according to claim 1, wherein
the setting unit sets the first period after transition is made to a state in which transmission of the input data to the arithmetic unit is not used or expected.

3. The information processing apparatus according to claim 1, wherein
the setting unit determines as the first period the number of cycles obtained by subtracting the number of second cycles from the number of first cycles.

4. An information processing apparatus comprising:
one or more memories storing instructions; and
one or more processors executing the instructions to cause the information processing apparatus to function as:
an arithmetic unit that performs arithmetic operation processing using a hierarchical network;
a storage unit that stores input data inputted to the arithmetic unit and output data outputted from the arithmetic unit;
a transmission unit that transmits to the arithmetic unit the input data stored in the storage unit;
a reception unit that receives and stores in the storage unit the output data from the arithmetic unit; and
a control unit that controls, in a case where it is not possible to transfer the output data, supply of an operation clock to the reception unit based on network information that indicates a structure of the hierarchical network,
wherein the hierarchical network is a CNN (Convolutional Neural Network),
wherein the arithmetic operation processing includes convolution operation processing on the input data,
the network information includes at least one of a size of a convolution kernel that is used in the convolution operation processing on the input data and the number of feature planes, wherein the control unit includes:
a determination unit that determines, in a case where it is not possible to transfer the input data, whether or not to stop supply of the operation clock to the reception unit based on the network information;
a setting unit that sets, in a case where it is determined by the determination unit to stop supply of the operation clock to the transmission unit, a second period in which supply of the operation clock is stopped based on the network information; and
a clock control unit that stops supply of the operation clock to the reception unit in the second period and, after the second period has expired, resume supply of the operation clock to the reception unit,
wherein the determination unit calculates, based on the network information, a number of third cycles from when the arithmetic unit outputs one output data until when the arithmetic unit outputs the next output data and, in a case where the number of third cycles is larger than a number of fourth cycles that is a sum of the number of cycles for stop of clock supply to the reception unit by the clock control unit and the number of cycles for resumption of data reception by resumption of clock supply, determines to stop supply of the operation clock to the reception unit.

5. The information processing apparatus according to claim 4, wherein
the setting unit sets the second period after transition is made to a state in which reception of output data from the arithmetic unit is not used or expected.

6. The information processing apparatus according to claim 4, wherein
the setting unit determines as the second period the number of cycles obtained by subtracting the number of fourth cycles from the number of third cycles.

7. A method of controlling an information processing apparatus comprising an arithmetic unit, a storage unit, a transmission unit, and a reception unit,
the method comprising:
transmitting input data stored in the storage unit to the arithmetic unit by the transmission unit;
performing arithmetic operation processing on the transmitted input data using a hierarchical network by the arithmetic unit; and
receiving the output data from the arithmetic unit and storing the received data in the storage unit by the reception unit, and
the method further comprising:
determining whether it is possible to transmit the input data from the storage unit to the arithmetic unit; and
in a case where it determined that it is not possible to transmit the input data, a control unit for controlling supply of an operation clock to the transmission unit based on network information that indicates a structure of the hierarchical network,
wherein the hierarchical network is a CNN (Convolutional Neural Network),
wherein the arithmetic operation processing includes convolution operation processing on the input data,
the network information includes at least one of a size of a convolution kernel that is used in the convolution operation processing on the input data and the number of feature planes,
wherein the control unit includes:
a determination unit that determines, in a case where it is not possible to transfer the input data, whether or not to stop supply of the operation clock to the reception unit based on the network information;
a setting unit that sets, in a case where it is determined by the determination unit to stop supply of the operation clock to the transmission unit, a second period in which supply of the operation clock is stopped based on the network information; and
a clock control unit that stops supply of the operation clock to the reception unit in the second period and, after the second period has expired, resume supply of the operation clock to the reception unit,
wherein the determination unit calculates, based on the network information, a number of third cycles from when the arithmetic unit outputs one output data until when the arithmetic unit outputs the next output data and, in a case where the number of third cycles is larger than a number of fourth cycles that is a sum of the number of cycles for stop of clock supply to the reception unit by the clock control unit and the number of cycles for resumption of data reception by resumption of clock supply, determines to stop supply of the operation clock to the reception unit.

8. A method of controlling an information processing apparatus comprising an arithmetic unit, a storage unit, a transmission unit, and a reception unit,
the method comprising:
transmitting input data stored in the storage unit to the arithmetic unit by the transmission unit;
performing arithmetic operation processing on the transmitted input data using a hierarchical network by the arithmetic unit; and
receiving the output data from the arithmetic unit and storing the received data in the storage unit by the reception unit, and
the method further comprising:
determining whether it is possible to receive the output data from the arithmetic unit to the storage unit; and
in a case where it determined that it is not possible to transmit the input data, a control unit for controlling supply of an operation clock to the transmission unit based on network information that indicates a structure of the hierarchical network,
wherein the hierarchical network is a CNN (Convolutional Neural Network),
wherein the arithmetic operation processing includes convolution operation processing on the input data,
the network information includes at least one of a size of a convolution kernel that is used in the convolution operation processing on the input data and the number of feature planes,
wherein the control unit includes:
a determination unit that determines, in a case where it is not possible to transfer the input data, whether or not to stop supply of the operation clock to the reception unit based on the network information;
a setting unit that sets, in a case where it is determined by the determination unit to stop supply of the operation clock to the transmission unit, a second period in which supply of the operation clock is stopped based on the network information; and
a clock control unit that stops supply of the operation clock to the reception unit in the second period and, after the second period has expired, resume supply of the operation clock to the reception unit,
wherein the determination unit calculates, based on the network information, a number of third cycles from when the arithmetic unit outputs one output data until when the arithmetic unit outputs the next output data and, in a case where the number of third cycles is larger than a number of fourth cycles that is a sum of the number of cycles for stop of clock supply to the reception unit by the clock control unit and the number of cycles for resumption of data reception by resumption of clock supply, determines to stop supply of the operation clock to the reception unit.

\* \* \* \* \*